(12) United States Patent
Quadracci et al.

(10) Patent No.: US 9,542,436 B2
(45) Date of Patent: *Jan. 10, 2017

(54) EMPLOYING ASSOCIATIVE MEMORY FOR ENHANCED LIFECYCLE MANAGEMENT

(75) Inventors: Leonard J. Quadracci, Seattle, WA (US); Brian Warn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 424 days.

This patent is subject to a terminal disclaimer.

(21) Appl. No.: 12/368,015

(22) Filed: Feb. 9, 2009

(65) Prior Publication Data
US 2010/0205192 A1    Aug. 12, 2010

(51) Int. Cl.
*G06F 17/30* (2006.01)
(52) U.S. Cl.
CPC ... *G06F 17/30398* (2013.01); *G06F 17/30522* (2013.01); *G06F 17/3053* (2013.01)
(58) Field of Classification Search
CPC .................. G06F 17/30572; G06F 2216/03
USPC ....................................................... 707/767
See application file for complete search history.

(56) References Cited

U.S. PATENT DOCUMENTS

| 5,351,247 | A  | * | 9/1994 | Dow et al. ....................... 714/26 |
| 6,868,525 | B1 | * | 3/2005 | Szabo ............... G06F 17/30067 705/14.53 |
| 7,181,438 | B1 | * | 2/2007 | Szabo ............... G06F 17/30522 |
| 2002/0184178 | A1 | * | 12/2002 | Tasooji et al. ................... 706/50 |
| 2003/0074159 | A1 | * | 4/2003 | Bechhoefer et al. ......... 702/181 |
| 2003/0158702 | A1 | * | 8/2003 | Busche et al. ................ 702/181 |
| 2003/0212699 | A1 | * | 11/2003 | Denesuk et al. .............. 707/102 |
| 2004/0083232 | A1 | * | 4/2004 | Ronnewinkel et al. ... 707/104.1 |
| 2005/0060343 | A1 | * | 3/2005 | Gottsman et al. ............ 707/102 |
| 2006/0085447 | A1 | * | 4/2006 | D'Urso ........................ 707/100 |
| 2008/0109411 | A1 | * | 5/2008 | Young et al. ..................... 707/3 |
| 2008/0215565 | A1 | * | 9/2008 | Sun et al. ......................... 707/5 |

OTHER PUBLICATIONS http://www.saffrontech.com/saffron-enterprise.shtml—Saffron Technology, Inc., Feb. 10, 2009.
http://www.sra.com/netowl/—NetOwl Entity Extraction and Text Mining Tools, Feb. 10, 2009.

* cited by examiner

*Primary Examiner* — Wei Zhen
*Assistant Examiner* — Brahim Bourzik
(74) *Attorney, Agent, or Firm* — Miller, Matthias & Hull LLP

(57) ABSTRACT

A non-conformance analysis system may have an associative memory subsystem populated with information involving a plurality of entities defining different attributes of a component, with each entity being categorized under a user defined entity type, the entities and entity types forming an associative memory. A user input device may be used for enabling a user to input a query concerning the component, and to obtain information useful for managing a lifecycle of said component. An associative memory entity analytics engine in communication with the associative memory subsystem, and responsive to said user input device, searches the associative memory using the information provided in the query to retrieve entities helpful to the user in assessing the lifecycle of the component.

19 Claims, 10 Drawing Sheets

EMPLOYING ASSOCIATIVE MEMORY FOR ENHANCED LIFECYCLE MANAGEMENT

CROSS-REFERENCE TO RELATED APPLICATIONS

The present application is related in general subject matter to pending U.S. patent application Ser. No. 12/368,024, filed Feb. 9, 2009, entitled "Non-Conformance Analysis Using An Associative Memory Learning Agent", assigned to The Boeing Company, and hereby incorporated by reference in its entirety into the present application. The present application is further related in general subject matter to pending commonly assigned U.S. patent application Ser. No. 12/368,047, filed Feb. 9, 2009, entitled "Associative Memory Learning Agent For Analysis Of Manufacturing Non-Conformance Applications," assigned to The Boeing Company, and hereby incorporated by reference in its entirety into the present application.

FIELD

The present disclosure relates to systems and methods for analyzing the lifecycle of a part, and more particularly to a system and method that learns the lifecycle of a part and then is able to use this memory or learning to provide input to manage the part or similar parts throughout their their lifecycle.

BACKGROUND

The statements in this section merely provide background information related to the present disclosure and may not constitute prior art.

Current parts lifecycle analysis systems and methods do not consider common attributes between parts from the same or different manufacturers. For example, assume that a particular part ABC has a particular coating, and that part ABC has an expected part lifespan or has an identified non-conformance. It is currently not impossible to review all of the parts in a system that may include the particular coating because of the huge numbers and diverse nature of parts that use the coating. This is especially so in complex manufacturing processes, for example in building commercial aircraft, where vast numbers of parts are involved in the construction of such an aircraft.

Thus, there presently is no means for focusing, in a rapid and orderly manner, on those parts that may be similar to a particular part or that have characteristics in common with the particular part. Thus, even if one should determine that a part or a component of a subassembly having a particular attribute should be reviewed, using that information to evaluate the lifecycle of similar parts or similar components of a subassembly has not been achieved.

Also, databases which have been used in the past for tracking part information have often been quite extensive in size. Such databases often may contain textual content that is input by a large number of different individuals, possibly designers, producers, operators, technicians, maintenance personnel, etc. As a result, differences in vernacular used to describe characteristics of parts or other features of the components involved is very common. Thus, there exists a continual challenge to extract pertinent information from large volumes of current and historical free text, which leads to a multitude of correlation issues that add to the complexity of a part/component lifecycle analysis. This also gives rise to a plethora of computational and analytic problems.

The usual result is long analysis and mitigation times which lead to high costs, which thus can be very burdening if not unacceptable for many businesses, governmental operations or manufacturing entities. These limitations also make it difficult, if not impossible, to use the available stored non-conformance information in a proactive manner to efficiently manage the lifecycles of parts or components.

SUMMARY

In one aspect the present disclosure relates to a non-conformance analysis system. The system may comprise an associative memory subsystem populated with information involving a plurality of entities defining different attributes of a component, with each entity being categorized under a user defined entity type, the entities and entity types forming an associative memory. A user input device is used for enabling a user to input a query concerning the component to obtain information useful for managing a lifecycle of the component. An associative memory entity analytics engine in communication with the associative memory subsystem, and responsive to the user input device, searches the associative memory using the information provided in the query to retrieve entities helpful to the user in assessing the lifecycle of the component.

In another aspect the present disclosure relates to a method for forming a system for managing a lifecycle of a component. The method may comprise using an associative memory subsystem populated with information involving a plurality of entities, with each entity being categorized under a pre-defined entity type, and the entity types and entities collectively forming an associative memory. An input device may be used to enable a user to input a query concerning information related to managing a non-conformance of the component. An entity analytics engine in communication with the input device and said associative memory subsystem may be used to analyze entities stored in the associative memory and to retrieve specific ones of the entities stored in the associative memory that include information helpful to the user in managing a non-conformance of the component.

In still another aspect the present disclosure relates to a method for managing a lifecycle of a component. The method may comprise providing an associative memory subsystem having an associative memory. The associative memory may have information relating to the component, the information being organized in accordance with pre-defined entity types, where each entity type has at least one entity representing a specific attribute. An entity analytics engine may be used to search the associative memory using information provided from a user through a query. The entity analytics engine may search to obtain all relevant entities containing attributes that may be related to the information in the query. The relevant entities may be output to the user for analysis by the user.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
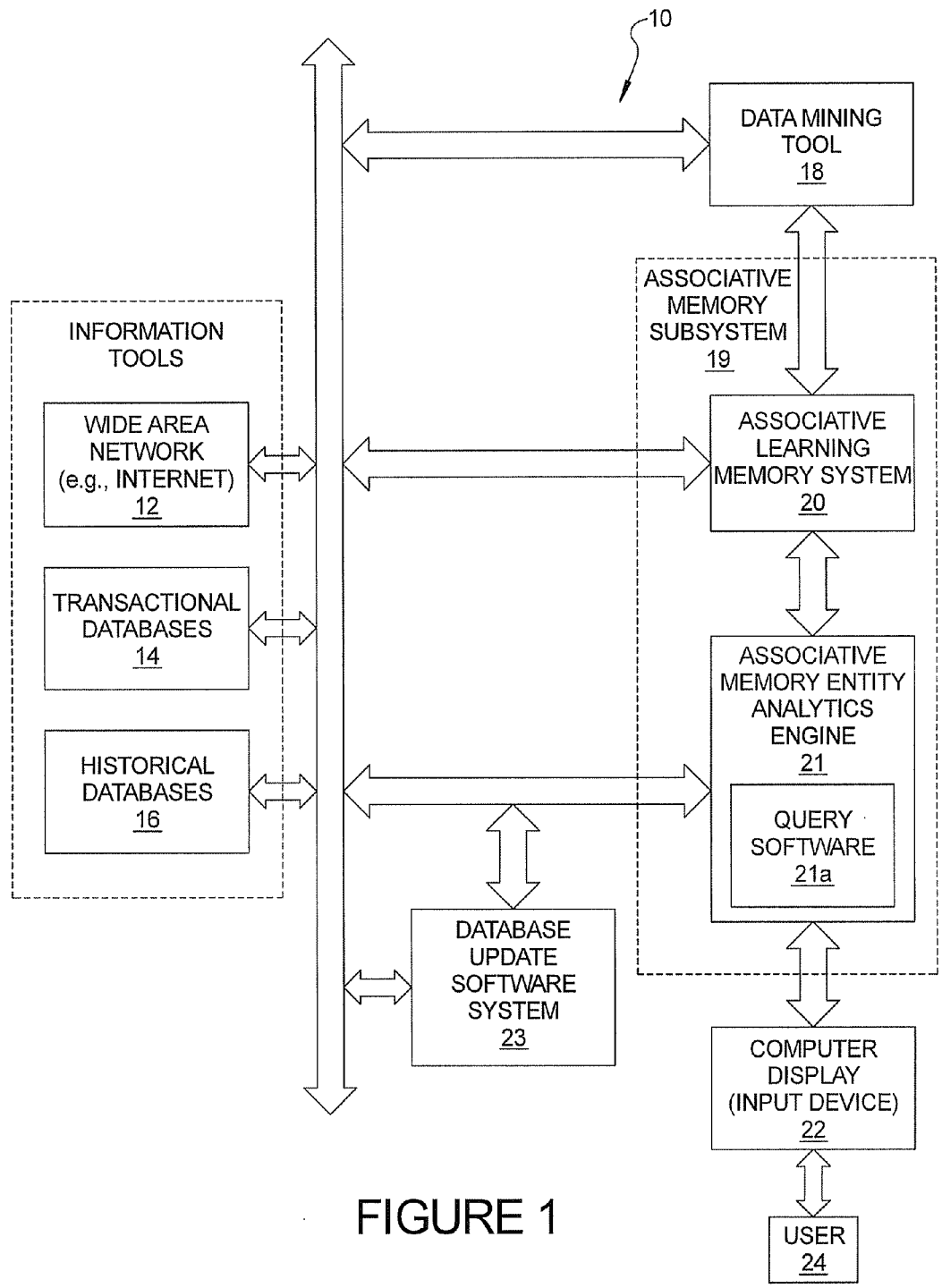
FIG. 1 is a block diagram of a system in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a non-conformance analysis system having an associative learning agent 10, and which will be referred to throughout the following discussion for convenience as "the system 10". Non-conformance may include any condition that is at variance with a nominal condition, and may further include, for example, a suspected anomaly, issue, test failure, or anomalies with a system or portion thereof. The system 10 is suited for use in any application where non-conformance analysis of a system or process is required, and may be part of a lifecycle management information system, tool, or methodology to assist persons in making lifecycle-related decisions. While the system 10 is especially well suited for large, complex systems and products, for example the troubleshooting or maintenance of commercial aircraft, it will be appreciated that the system may be adapted for use with much smaller and less complex systems, products and methods. The present system 10 is therefore expected to find utility with a wide variety of systems, products and methods where rapid non-conformance analysis and non-conformance identification is required.

Referring to FIG. 1, the system 10 may include one or more diverse independent information storage tools where various forms of non-conformance information may be stored. Three such exemplary information storage tools are illustrated as a wide area network 12 (for simplicity simply "web 12"), one or more transactional databases 14 and one or more historical databases 16. However, it will be appreciated that any type of database or information storage system capable of storing useful non-conformance related information may be used with the system 10. Historical database 16 may be used to store historical non-conformance information concerning subsystems, component parts, vendors or any other criterion that may prove useful in non-conformance analysis. Transactional database 14 may store reports involving specific types of non-conformances previously investigated, for example assembly issues or anomalies, test anomalies, reports by engineers or maintenance personnel on what action was taken to remedy an anomaly or even what repair action(s) had no effect on the anomaly. Transactional database 14 may also contain usage information about the specific platform, subsystem or part; system logs that include platform usage (e.g. operating environment, number of cycles, hours of operation); as well as on-line standards documentation or trade journals that describe potential problems, non-conformance, or changes in materials or manufacturing technology.

As another example of useful information that may be stored in one or more of the databases 14 and 16, consider the situation when there is a change in the way a part for a subsystem is manufactured, and then at some future time other users (or even users in a different industry) discover a potential problem and report information pertaining to the potential problem. It might take considerable time to determine that a potentially pervasive problem may exist that is common across industries. As one specific example, assume that the coating on a wire bundle was changed to reduce potential environmental damage. The wire with coating is used by many different industries. Now assume that it is typical to mark with stickers to identify (ID) the different wire ends to ID the destination component during manufacturing. Now also assume that the sticker glue is not compatible with the new formulation of the wire bundle coating and causes the wires to short. Now an individual working in one industry discovers a potential problem and reports the issue in a trade journal. If the relevant information from the trade journal is stored in one or more of the databases 14 or 16, a user in a different industry facing the same or a similar potential problem may use the system 10 to query and learn all the pertinent information stored that concerns this specific subsystem. The attributes of a given subsystem that makes use of the wire bundle may include that it is made up of this specific type of wire (e.g., part of the bill or materials associated with every subsystem). And because it has this wire attribute, that specific wire will associate this subsystem with the journal entry that describes potential problems associated with the specific subsystem that uses the wiring bundle.

Thus, it will be appreciated that non-conformances requiring analysis by the system 10 may occur in manufacturing processes, with independent components or parts, with coatings, with raw materials, or may be caused by individuals or even teams of individuals. As such the system 10 may be supplied with whatever form of information or data that may be helpful in performing a non-conformance analysis investigation. The information tools 12, 14 and 16 may also include textual content that has been supplied by a plurality of designers, engineers, scientists, producers, operators, technicians, maintenance personnel and other contributors, so differences in documentation approach, terminology, vernacular and even spelling of non-conformance conditions and related information may be present.

With further reference to FIG. 1 the system 10 also may include a data mining tool 18 and an associative memory subsystem 19. The associative memory subsystem 19 may include an associative learning memory 20 (hereafter simply "associative memory 20") and an associative memory entity analytics engine 21 (hereinafter the "entity analytics engine 21"). An input device such as a computer display terminal 22 may communicate bidirectionally with the entity analytics engine 21. The associative memory 20 is in bidirectional communication with the entity analytics engine 21. The entity analytics engine 21 may make use of one processor, but more typically a plurality of processors, that operate in connection with entity analytics query software 21a to perform queries for information stored in the associative memory 20. The entity analytics engine 21 receives non-conformance queries from a user 24 via the computer display device 22 and the query software 21a and controls the generation of the pertinent entity types and entities for a given input query by the user. The entity analytics engine 21 converts the words in the non-conformance input query into attributes and retrieves all of the specific entities (relating to various different entity types) that have information that meets one or more of the attributes relating to the non-conformance input query. Any such information is retrieved from the associative memory system 20. By the terminology "attribute" it is meant any piece of knowledge or characteristic such as adjectives, verbs, nouns (e.g., "yellow", "rust", "bent", "dented", "nut", "bolt", "corrosion"); any part number, any process step, any manufacturer name, any assembly line number or build date, any technical or service bulletin, etc., that relates to the non-conformance input query.

A database update software system 23 is used to update the information tools 12, 14 and 16 with any documents created by the user, such as reports concerning a successful fix of a non-conformance being investigated, or any other information that the user wishes to input that may be of interest in future non-conformance analysis related to the same or similar analyses. The entity analytics engine 21 periodically updates the associative memory 20 with new information retrieved from information tools 12, 14 and 16 so that the associative memory 20 will contain all of the entity information available to the system 10 when the system is next accessed for use by a user.

Prior to a first use of the system 10, a system designer defines at least one entity type, but more typically a plurality of entity types that relate to specific categories of information that may be used to help evaluate a non-conformance for a specific application. These entity types are mapped into the associative memory 20. The data mining tool 18 identifies a plurality of entities as it reviews all of the information available in the information tools 12, 14 and 16 and sends the identified information to the associative memory 20 for storage. Thus, each specific entity type may have associated with it at least one, but more typically a plurality of different specific entities. Depending on the application that the system 10 will be used with, dozens, hundreds or more entity types may be defined by the system designer to identify categories of information that may be useful in helping the user to analyze a non-conformance condition. For example and without limitation, entity types may be the names of vendors that supply component parts; mobile platform models; types of parts (e.g., fastener, spring, etc.); the names of customers that own the device or mobile platform being analyzed for a non-conformance; the names of subsystems of the mobile platform, device or system that is the subject of the non-conformance investigation; specific serial numbers of vehicles, subsystems or parts, etc. Entity types can thus be thought of as different categories or types of information (or even different ways or perspectives to remember the information) that may be useful in the non-conformance analysis process.

The specific entities of a given entity type can be thought of as specific objects or groupings that may represent specific items or components related to the application or business. For example and without limitation, an entity type of "fastener" may have several different entities associated with different part numbers for different, specific fasteners. Thus, for an entity type of "fasteners", different entities might exist for a specific style/type of rivet, a specific sized threaded bolt; a specific size of cotter pin, a specific sized nut, etc. One entity would be created for every fastener used by a business. In this example one, entity is created for every different type of fastener that the business uses. As another example, a specific entity type may be created for an "aircraft model", and may have several specific entities associated therewith that each specify a different, specific model of aircraft. As a further example, a specific entity type called "serial number" might be created, and it may have a number of specific, different entities associated therewith that each list a specific serial number. So a free text query by the user for non-conformance information concerning a specific serial number of a part or subsystem may be input to the system 10 by the user and the associative memory query software 21a will search the associative memory 20 for entities stored therein that have a relationship to that specific serial number.

The computer display terminal 22 may be used by a user of the system 10 to input free text queries to the associative memory 20 that pertain to the non-conformance being diagnosed. For example, a free text query might comprise a statement such as: "Wing flap corrosion being experienced on model XXX aircraft manufactured at ZZZ manufacturer at City/State" that is input through the computer display terminal 22 to the entity analytics engine 21. The ability to receive free text inputs is a significant advantage of the system 10 because it enables all data defining the potential problem to be used in the lifecycle analysis. Even a word in the free text query such as a adjective (e.g., "over tightened", "frayed", "worn", "broken", "bent", "burned", etc.) can represent an attribute that contributes to the entity analytics engine 21 finding related entities stored in the associative member 20 that may help the user with his/her non-conformance investigation. However, even structured information, such as simply a part number or model number, could be entered as the non-conformance query.

Another significant advantage of the system 10 is that it does not make use of reductive algorithms, which can actually eliminate some portions of input information that describe or characterize the non-conformance that could be helpful in troubleshooting the non-conformance condition. Such reductive algorithms typically categorize non-conformances into specific categories (e.g. related to the electrical system, passenger compartment, lighting system, etc.). Thus, the user is able to learn how many "types" of related non-conformance issues may have been previously searched.

Figure 2:
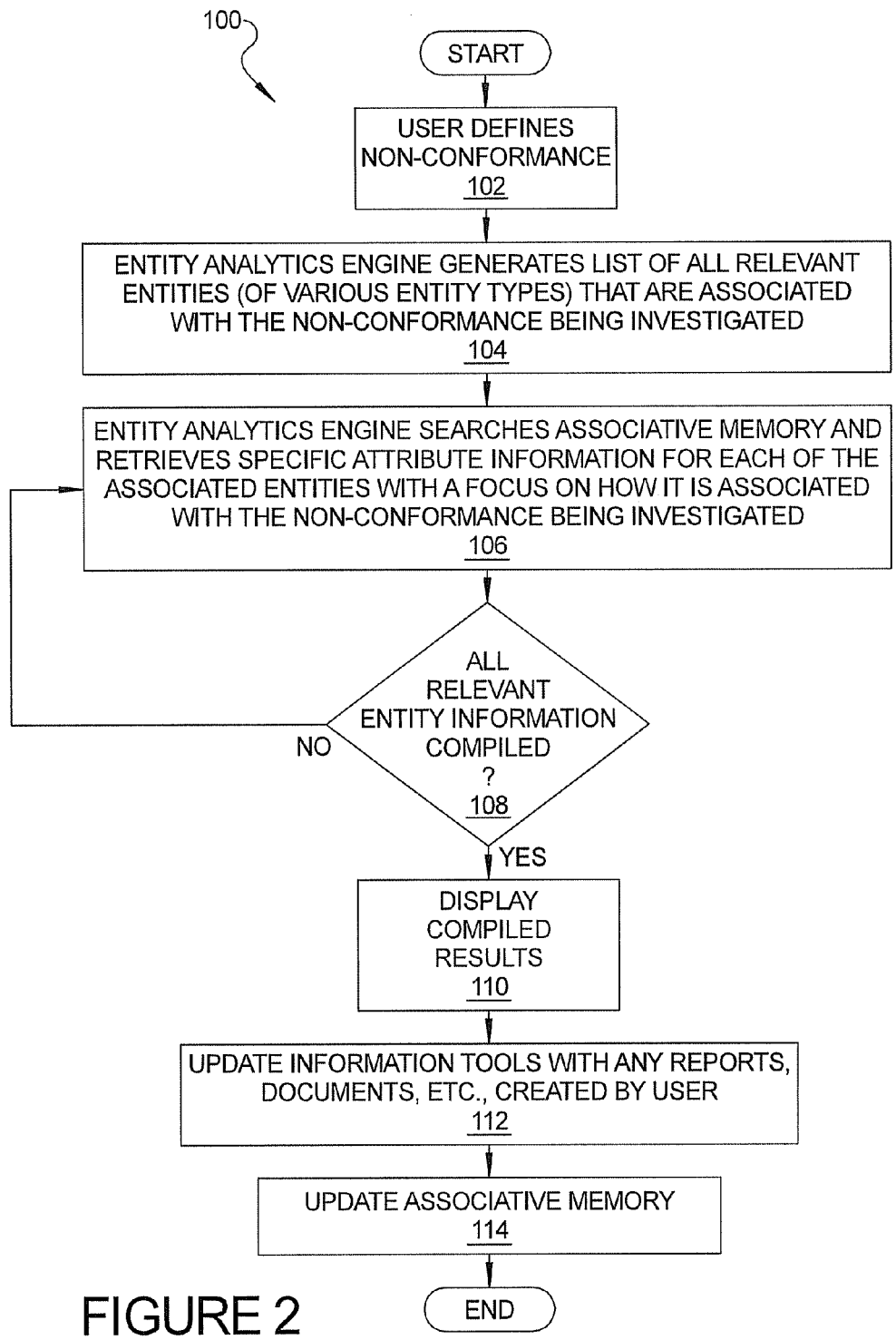
FIG. 2 is a flowchart illustrating one method for constructing the system of FIG. 1.

Referring now to FIG. 2, a flowchart 100 is shown of operations that are performed by the system 10 during a non-conformance analysis. At operation 102 the specific non-conformance is defined by the user via the computer display terminal 22. Again, as an example, a specific non-conformance issue might be defined in free text form as a text entry that reads: "Wing corrosion on a model XXX aircraft manufactured by ZZZ company". Alternatively, the user may enter a model name of a mobile platform, a part number of a specific part under investigation; a specific serial number of an assembly under investigation, etc. For the purpose of this example it will be assumed that the user provides a free text query.

The system 10 uses the entity analytics engine 21 to perform entity analytics searches on all of the words that make up the free text non-conformance query, as indicated at operation 104. The entity analytics engine 21 will recognize some words as entities and some as simply attributes, but will use each word in the search query in searching for every entity that may have some association with each word in the search query. At operation 106 the entity analytics engine 21 searches the associative memory system 20 to retrieve information having specific attributes for each associated entity. This search is performed with a focus on how the attributes are associated with the non-conformance being investigated. This operation is repeated with successive queries by the entity analytics engine 21, as indicated by query 108, until all the relevant entity and entity type information is compiled. At operation 110, the system 10 may generate a report of the search results that is sent to the computer display terminal 22 for display. This report would include all of the information associated with all entity types and all of the entities for each entity type. Typically this information may be generated within a few seconds or less from the time the user enters a description of the non-conformance being investigated. At operation 112 the information tools 12, 14 and 16 may be updated via the database update software system 23 with any information that the user has created after reviewing the entity type and entity information. At operation 114 the entity analytics engine 21 may update the associative memory 20 with any new information that was stored in the information tools 12, 14 and 16. This updating may involve populating existing entities with additional specific information or even creating new entities (e.g., by adding part numbers of additional parts, as new entities, that have been discovered to be pertinent to the performance or lifecycle management of a particular subsystem or component).

Figure 3:
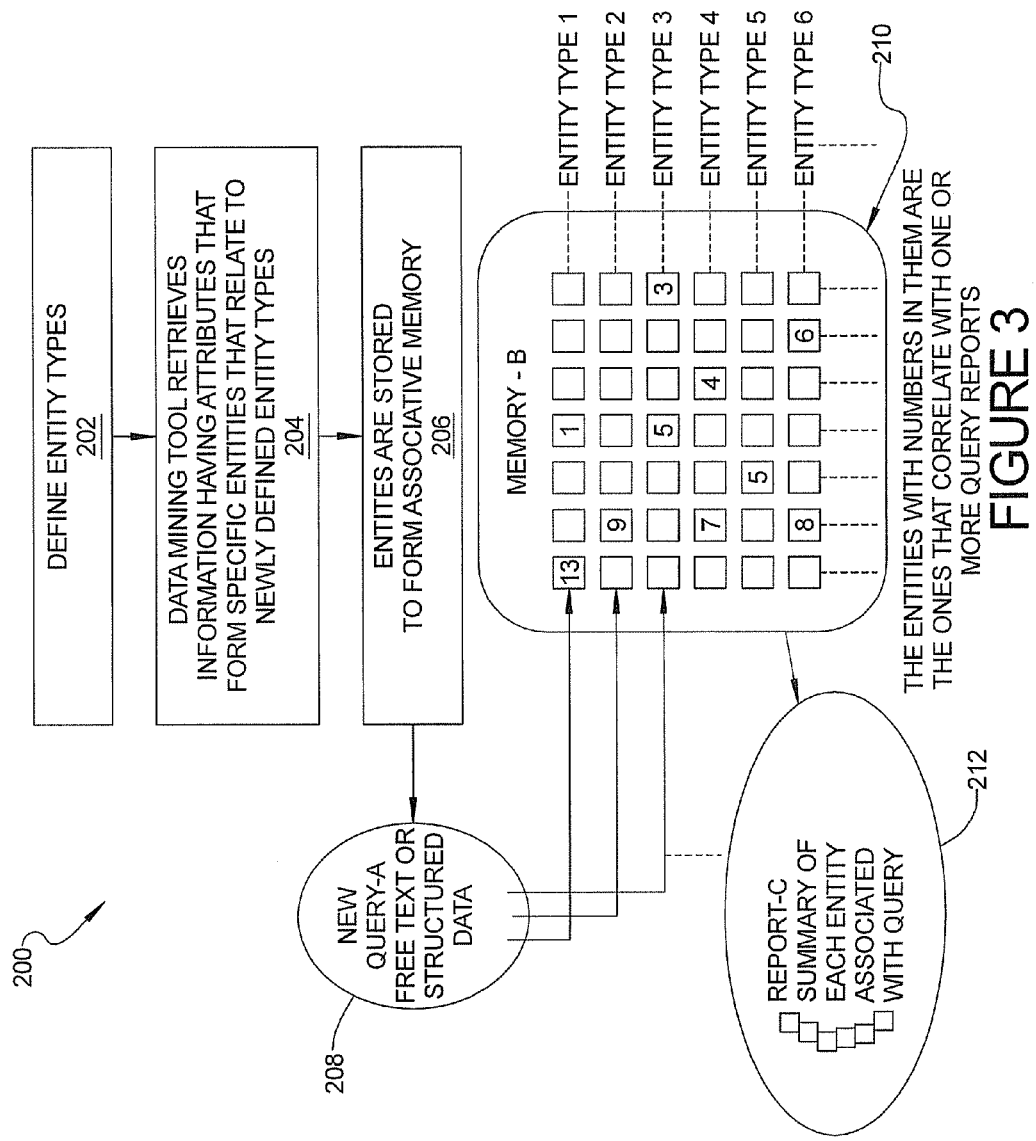
FIG. 3 is a diagram illustrating how the system of FIG. 1 may be used.

Referring now to FIG. 3, a diagram 200 of an operational flow of the system 10 is shown. At operation 202, prior to the first use of the system 10, the entity types that may be pertinent to a lifecycle analysis and management for a specific application are defined for the associative memory 20 by the system designer. Thus, for example, for non-conformance analysis of a specific commercial aircraft, a specific entity type might be of the major subsystems of the aircraft. This would assume that there could be non-conformance issues that can be resolved by looking at all the information associated with a major subsystem and not just at individual parts. Such an assumption would likely be an accurate one in this example, because it may be that non-conformance issues are clustered around one or more particular subsystems. For example, assume the user begins investigating a specific example of delamination. The user could enter a free text query into the computer display terminal 22 with the term "delamination". If most of the delamination issues found by the system 10 were related to a certain subsystem (e.g., a tail assembly), then the tail assembly entity could be displayed to the user.

At operation 204 the data mining tool 18 identifies and accesses all of the information tools to find and retrieve information having attributes that may form specific entities, where the specific entities relate to one or more of the newly defined entity types. At operation 206, all of the retrieved entities have their attributes correlated with one or more of the previously defined entity types and stored to form the associative memory 20. The retrieved information may thus involve historical non-conformance data concerning specific subsystems as well as specific components or parts of specific subsystems. Other exemplary historical data could involve historical repair information, subsystem use data, planned and unplanned maintenance actions and information, and service advisories, just to name a few. Various well known data mining tools exist for this purpose. For example, suitable data mining tools are available from SRA International, Inc. from Fairfax, Va.

At operation 208, when a non-conformance is to be investigated, a user enters pertinent information as free text or as structured data into the computer display terminal 22. At operation 210, the entity analytics engine 21 of the associative memory 20 analyzes all of the terms or structured data input by the user at operation 208, and determines the entity types and entities for which information needs to be obtained from the associative memory 20. Essentially, the associative memory queries performed by the entity analytics engine 21 involve successive queries of the associative memory 20 to obtain all of the relevant information pertaining to the selected entity types and entities. For example, one associative memory query may focus on the word "corrosion" that is part of a free text entry by the user describing the non-conformance condition to be investigated. The entity analytics engine 21 would retrieve all of the pertinent entities types and the specific entities that correlate with the non-conformance information provided by the user. This operation may be viewed as a "knowledge/discovery" operation in which the query software 21a of the entity analytics engine 21 accesses the associative memory 20 to find and extract all of the pertinent, saved non-conformance information available in the associative memory 20 that pertains to the entity types and entities that it has selected. The obtained information is then presented in a logically organized format by the entity analytics engine 21 to the computer terminal 22, as indicated by diagram 212.

Importantly, the entity analytics engine 21, through its repeated searching of the associative memory 20, returns information that also indicates how well correlated the retrieved entities and entity types are with the non-conformance information provided. As one example, the entity analytics engine 21 may indicate with a numerical value how many times a specific entity came up during the multiple memory queries that were performed by the entity analytics engine 21. Alternatively, the entity analytics engine 21 may provide other information that indicates more generically how strongly each of the retrieved entities and entity types are correlated with the non-conformance information input by the user. For example, the strength of correlation of each specific entity could be represented to the user through the use of different colors when displaying the specific entities that are retrieved. For example, if a particular entity came up only once, then the color white could be the background used to display that particular entity on the computer display terminal 22. However, any entity that came up three times or more could be displayed with a red background. These colors could of course be used in addition to numbers to indicate the exact frequency that each particular entity came up. Another alternative to help illustrate the strength of correlation could be the use of different font sizes for numbers displayed for each specific entity. For example, if a specific entity came up only once, it might be displayed in 10 point type size, but any entity that comes up three times or more could have a number associated therewith that is displayed in 16 point size. The resulting entity types and entities retrieved by the entity analytics engine 21, as well as the correlation information it provides, thus present the user with disparate ways (i.e., one for every related entity type) in which to view and investigate the specific non-conformance being analyzed. An example of an entity analytics engine available commercially is "SAFFRON ENTERPRISE™" available from Saffron Technology of Morrisville, N.C. It will be appreciated that the entity analytics query software 21a will be constructed by the system designer to recognize those words, numbers or even characters that are important in the specific type of application that the system 10 is being used with.

Figure 4:
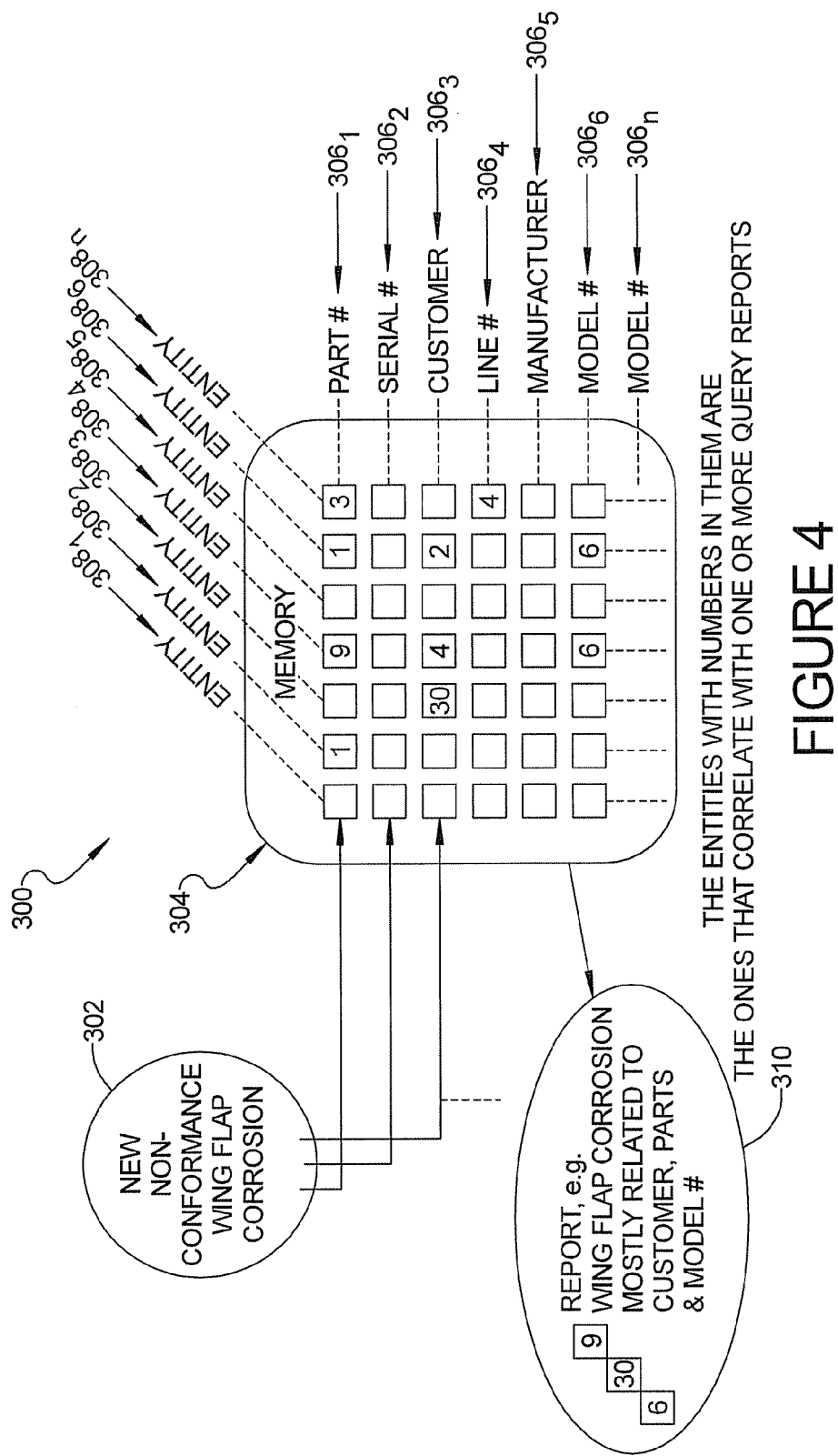
FIG. 4 is a diagram illustrating how the system may be used to obtain non-conformance information concerning a specific non-conformance issue involving wing corrosion on an aircraft.

Referring now to FIG. 4, an operational diagram 300 is provided to help illustrate a specific example of how the system 10 operates. The specific example relates to the "Wing Flap Corrosion" non-conformance mentioned earlier herein. At operation 302, a free text query may be entered by the user designating "Wing Flap Corrosion" as the non-conformance to be investigated. At operation 304 the entity analytics engine 21 sequentially performs a plurality of queries to retrieve from the associative memory 20 the information that pertains to the entity types and specific entities previously selected. The entity types are arranged in rows in this example denoted by reference numbers $306_1$-$306_n$. Thus, in this example the entity types "Part #", "Serial #", "Customer Name"; "Line #"; "Manufacturer Name"; and "Model #" are retrieved as all of the pertinent entity types. In actual practice, however, typically dozens, hundreds or more entity types may be retrieved that all relate to some attribute of the non-conformance information that the user has provided through his/her free text query. All of the entities $308_1$-$308_n$ associated with each of the entity types $306_1$-$306_n$, respectively, are also retrieved. A number may be provided with each entity $308_1$-$308_n$ indicating the number of times that each specific entity turned out to be involved in previous non-conformance investigations. For example, number "9" in the entity box $308_4$ in FIG. 4 might denote that a specific part number was involved in previously investigated wing corrosion non-conformance investigations a total of 9 times. Similarly, the number "30" in entity box of the "Customer Name" entity type row $306_3$ would indicate that a particular customer was somehow involved on 30 occasions with the wing flap corrosion issue being investigated. Likewise, the number "4" in row $306_4$ would indicate that a particular assembly line was involved four times with the wing flap corrosion issue being investigated. Thus, each entity file or record, (which may for convenience simply be termed an "entity box") in every entity type row $306_1$-$306_n$ represents a specific entity, or put differently, a specific piece of information that falls within a specific entity type. An entity $308_1$-$308_n$ that does not have a number indicates that it is not associated with the non-conformance information provided by the user. Each entity box may hold a variable amount of information, for example hundreds of megabytes of information, concerning that specific entity. For example, in an aircraft application, the information might be all the information associated with a specific aircraft model. In another example, an entity box might contain a few bytes of information associated with a part that has never been identified as having worn out and is not stocked. When a user does a query the entity analytics engine 21 looks at every entity box (from every entity type) and looks for the entity box that has information (associated entities and/or attributes) that best match the information (entities or attributes) in the user's query. The best matches are retrieved and sent to the user.

At operation 310, the information collected from the associative memory 20 at operation 304 may be summarized in a user friendly format to the user, possibly in a printed report or on the computer display terminal 22. From the entity type information, the entity information, and the numbers associated with the occurrence frequency of each specific entity, the user is able to quickly assess which entities may be highly pertinent to resolving the specific non-conformance investigation undertaken. The associative memory 20 effectively retrieves all types of previously stored information that may have a bearing on the specific non-conformance being investigation, as well as retrieving information on specific entities of each entity type that have previously been associated with a similar non-conformance seen in a prior non-conformance investigation.

Figure 5:
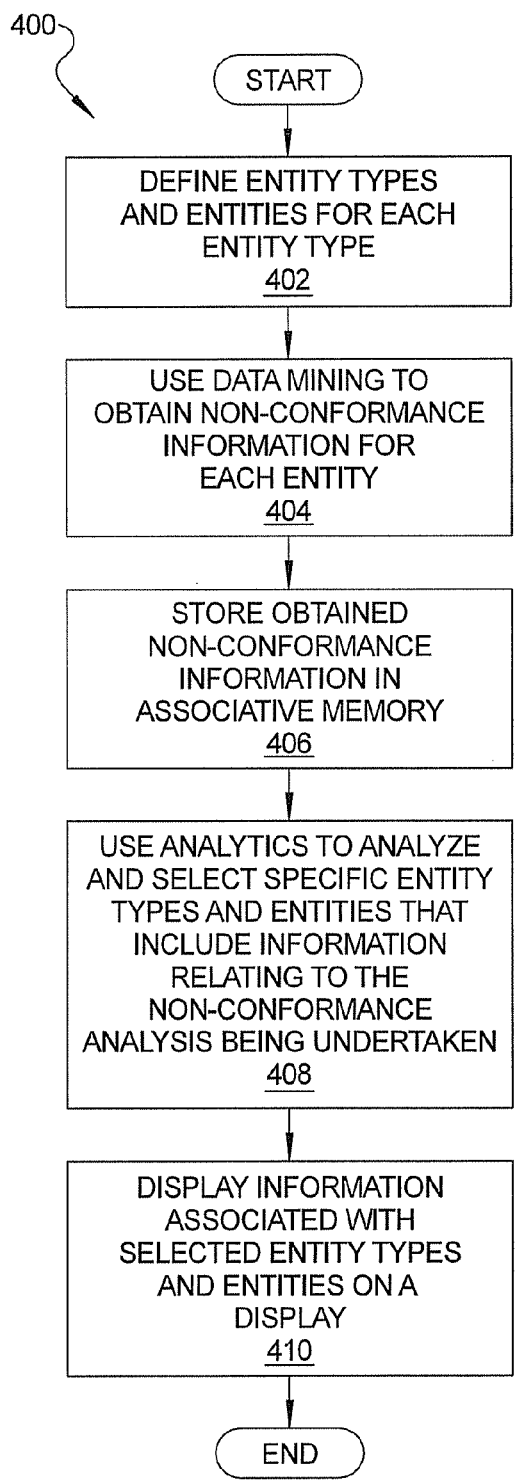
FIG. 5 is a flowchart specifically illustrating operations formed in creating an associative memory for use with the present system.

Referring to FIG. 5, a flowchart 400 is shown of operations that may be performed to form an associative learning memory. At operation 402 a plurality of entity types are defined. At operation 404 data mining of previously stored information from a plurality of information tools is performed to obtain specific information relevant to the entity types that are defined for use in the associative memory 20. At operation 406 specific information (entities and attributes associated with those entities) obtained during the data mining operation is stored in the associative memory 20. At operation 408, analytics are used to analyze the stored, specific non-conformance information and to retrieve specific ones of the entities (of various different entity types) that include information pertinent to the specific non-conformance analysis being undertaken. At operation 410, the obtained entities and the information associated with those entities may be displayed on a suitable display, for example on computer display terminal 22.

Figure 6:
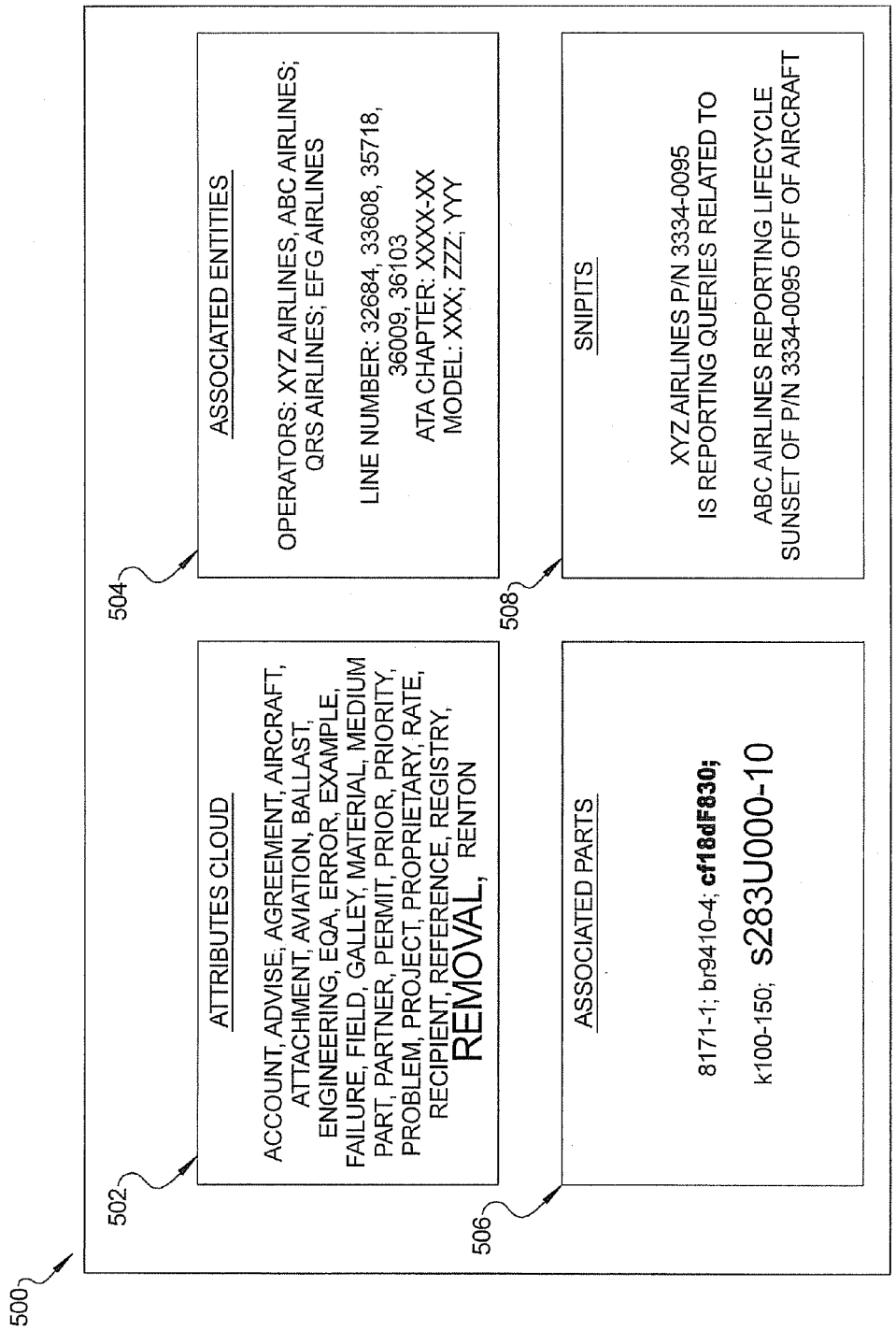
FIG. 6 is an illustration of one exemplary format in which entity type and entity information obtained from the associative memory system may be presented to the user for consideration.

Referring to FIG. 6, one exemplary arrangement is shown in diagram 500 for presenting the entity and entity type information obtained from the associative memory 20 searching to a user. It will be appreciated that this information may be displayed on the computer display terminal 22 or possibly just printed out from a printer (not shown) in communication with the computer display terminal 22. The diagram 500 shows an "Attributes Cloud" box 502, an "Associated Entities" box 504, an "Associated Parts" box 506 and a "Snippets" box 508. The Attributes Cloud box 502 lists attributes (i.e., represented by words) that relate to any of the terms input by the user in the initial non-conformance query. One particular attribute, "removal", is shown in bold print to signify that this attribute came up more frequently than the other attributes as the associative memory 20 queries were performed by the entity analytics engine 21 on the content stored in the associative memory 20. The "Associated Entities" box 504 shows the entity types pulled up from the associative memory searching 20 as being airline "Operators" and "Line Number". The four specific airlines that came up during the searching (i.e., "XYZ Airlines", "ABC Airlines", "QRS Airlines" and "EFG Airlines") imply that these specific four airlines are relevant to one or more of the search terms used in the non-conformance query input by the user. Entity types "ATA Chapter" and "Model" also came up, along with several specific entities for each (e.g., specific aircraft model numbers for the "Model" entity type). This means that these specific entities are involved with, or match, one or more of the search terms used in the non-conformance query. The "Associated Parts" box 506 lists specific part numbers (which represent specific entities) that came up during the associative memory 20 searching that are somehow connected with, or correlated to, one or more of the search terms used in the initial non-conformance query. The last number (i.e., s283U000-10) is shown in enlarged and bold face print, indicating that it came up more frequently than any other part number during the associative memory 20 searching. The "Snipits" box 508 provides short summaries of particular reports that came up in the associative memory 20 searching, and that involve one or more of the search terms used in the non-conformance inquiry input by the user. From this collective information, the user is able to quickly focus in on those entity types and specific entities that have a direct bearing on the non-conformance being investigated.

The system 10 and method described herein provides a number of significant advantages over previously developed relational databases that have traditionally been used for non-conformance investigation and analysis. A central overall advantage of the system 10 is its ability to rapidly correlate multiple sources and multiple formats of informational data—including free text formats—and present it in such a way that a user can rapidly and accurately identify and effectively manage the lifecycle of one or more parts through intelligent queries based on subject matter experts choosing the set of entities.

The system 10 can also answer other related questions without re-building the structure of the memory entities. The advantage of associative memory/entity analytics ("AM/EA") implementations is that because one can have such a large number of different entity types, one can answer and discover different questions. In the associative memory 20 of the present system 10, when something is "observed" by the system 10, it is recorded in the associative memory 20 for every related entity that is observed as being related to the non-conformance information being input by the user. In a relational database the information is typically stored only once in the location chosen by the database designer. Because it is stored in one way it can be accessed only in one way, typically through the key that defines that specific table in a relational database.

Another significant advantage of the system 10 is that the system 10 may use all available non-conformance information/data provided by the user when performing the associative memory 20 queries. It does not, as other previously developed systems typically do, store a summarized version of the information being input by the user in order to reduce the scope of the query (i.e., the scale of the searching that will be done) to something that works with the technology, and in so doing lose important or otherwise useful facts present in the source data. Existing relational database manipulation tools can find keywords, but the perspective is always that of the relational database designer, not the entity that relates to the current query. Relational databases also generally do not account for all the entities that reside in the free text information provided by the user. Relational databases further are often slow and difficult to manipulate. The present system 10 can typically provide responses to user inputs within a second or less, while a typical relational database may require significantly longer times to search and obtain relevant, stored non-conformance information.

The system 10 also does not rely on rules based systems, which also may suffer from the drawback of eliminating potentially useful portions of the information contained in the initial non-conformance inquiry made by the user. This is because the "rules" that are used to find "relevant" data by their very nature limit the flexibility of the system to the implemented rules. The other drawback with rules based systems is that the number of rules required will grow with the size of system and the increasing quantity and types of information that must be accessed and searched. So as a rules based system grows larger and larger, it becomes more unmanageable.

Figure 7:
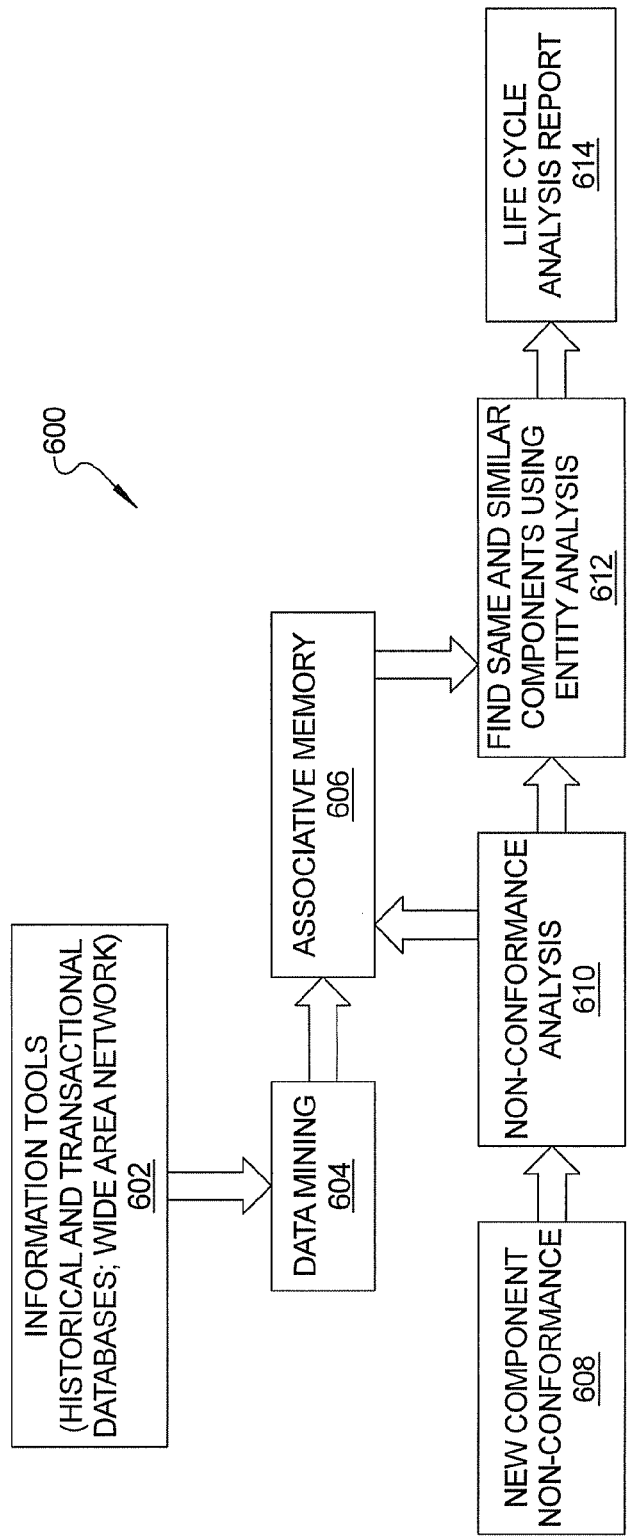
FIG. 7 is a flow diagram illustrating operations performed by another aspect of the present disclosure that forms a method for managing a non-conformance of a component.

Referring to FIG. 7, another aspect of the present disclosure involves a system and method that is well suited for performing non-conformance analysis and component lifecycle analysis. It will be appreciated that the system 10, while being explained in connection with FIGS. 1-6 as a non-conformance investigation system, is also well suited to be configured, with little or no physical hardware modification, for use as a non-conformance and lifecycle managing system for managing non-conformances or the lifecycles of components, subsystems, parts and other items. The ability to proactively determine non-conformance or lifecycles of components can form a significant benefit in reducing the down time of equipment, systems or mobile platforms whose operation might otherwise be significantly affected by a component that wears out unexpectedly. These and other benefits of the system 10, when configured as a non-conformance analysis and management system, will be described more fully in the follow paragraphs.

Referring initially to the flow diagram 600 of FIG. 7, the basic phases or operations that may be performed in conducting a non-conformance analysis or component lifecycle analysis are shown. At operation 602 an historical database may be accessed to provide information to a memory forming device. At operation 604 the memory forming device may be used to populate an historical associative memory subsystem, as indicated at operation 606. The historical associative memory subsystem may be formed by associative memory subsystem 19 of FIG. 1. The memory forming operation 604 may comprise using a data mining tool, such as data mining tool 18 of system 10, that periodically accesses the historical database to update the historical associative memory with any new information that has been added to the historical parts database.

At operation 608 a user first identifies a component or attribute of a component that has a particular non-conformance or is suspected as being related to another part having a particular non-conformance. At operation 610 the information concerning the component or attribute of the component is analyzed, for example using the entity analytics engine 21, which accesses the historical associative memory to find all relevant entity information stored in the historical associative memory concerning the component or attribute in question. At operation 612 an additional entity analytics analysis is performed to determine entity information for the same component being investigated by the user, as well as entity information for components that are similar to the specific component that the user is investigating. For example, the user may be investigating the lifecycle of a specific type of electrohydraulic actuator used to move a particular flight control component on a commercial aircraft. Having lifecycle information concerning the specific, selected actuator would be highly useful in managing its lifecycle. And it would also be helpful to the user to have non-conformance information concerning similar electrohydraulic actuators used to control other components of the aircraft. Such additional information concerning similar actuators would likely be valuable to the user in enabling the user to perform a broader, more comprehensive lifecycle analysis for the specific actuator under consideration. At operation 614 the retrieved entity information may be presented to the user in a report format, for example using the computer display terminal 22. Alternatively, a printed non-conformance analysis or component lifecycle report could be provided to the user.

The ability to proactively manage the lifecycle of a component (i.e., replacement before the component wears out) depends in part on understanding the stages of a component as is progresses from the design stage to the time at which it wears out. This is important because a component that is approaching the end of its lifecycle, even though it has not worn out yet, but has followed a similar pattern or use as a part that has worn out, could have a similar lifecycle to the same or similar type of component that has worn out.

Figure 8:
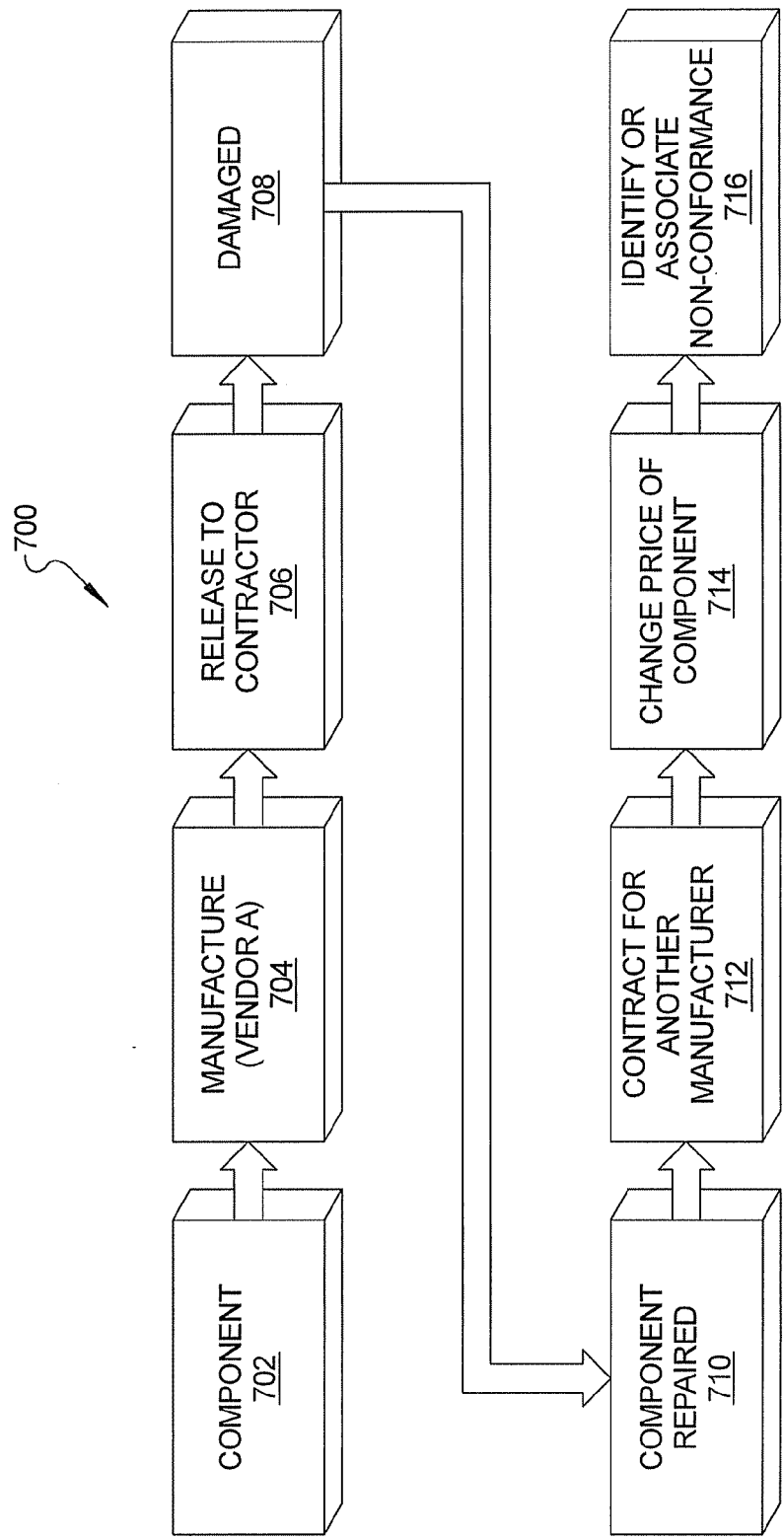
FIG. 8 is a flow diagram illustrating how a typical part may progress along its lifecycle.

Thus, understanding the lifecycle progress of various parts can be extremely useful in managing the replacement of components that wear out. The flow diagram 700 of FIG. 8 is intended to help illustrate an exemplary lifecycle for a component. At stage 702 the component in question may be designed in accordance with a particular specification, for example in accordance with a specific weight, material, using a particular coating, or being suitable for use in a specific location and/or environmental condition (e.g., temperature, exposure to environmental elements such as rain, ice, etc.). At stage 704 the component may be manufactured by a particular vendor. At stage 706 the component may be released to a particular contractor. At stage 708, at some future time the component may be identified as possibly damaged or malfunctioning. At operation 710 the component may be repaired.

In practice the component may be used on various different systems or mobile platforms, for example on different aircraft of a particular airline. At stage 710 the repaired part may be the subject of a new contract for a different system or mobile platform. Or it may be that the repaired part is reinstalled on a different system or different commercial aircraft from the one in which it was initially used with. At operation 712 the part may be the subject of a contract with another manufacturer. At operation 714 the price of the part may be changed. This could be an example of an event that has no impact on the lifecycle of a part, but it might also be an indication of a vendor "dumping" a part because a better one is being released soon. Every type of part from every industry has the potential of having a different lifecycle where some of the information associated with the part is significant and other information is less significant (i.e. "just noise") from the lifecycle perspective. Using the associative memory 20 and entity analytics engine 21, and treating the part or the subsystem as an entity, makes it possible to "learn" or remember a pattern that leads up to a point where analysis is needed and replacement may be recommended. The lifecycle is stored in the entity and the entity analytics engine 21 only has to look for an entity (or entities) with significantly similar histories or lifecycles (whatever those histories are). It is possible for parts types to share one lifecycle. Is also possible that a part can have several lifecycle possibilities. Hence, it is impossible to predict the lifecycle of a particular part, component, subsystem, or system with certainty. At stage 716 the part may be identified has having another or similar non-conformance again.

From the foregoing diagram of FIG. 8 it will be appreciated that a sizeable portion of potentially valuable non-conformance analysis (or lifecycle) information occurs post-production of the component. In a real world commercial aircraft manufacturing application it may be that a new manufacturer has applied to the Federal Aviation Administration to manufacture the part after a first manufacturer has been manufacturing the component for some time. And it may be that the component has a long lead time to manufacture (e.g., may require complex tooling to be created before manufacturing can begin). All of this information may be valuable in assessing a non-conformance or lifecycle of the component, as well as identifying what other subsystems, manufacturers, mobile platforms, etc., may be affected or involved with the component in question. Accordingly, it should be appreciated that being able to manage the lifecycle of a component has wide ranging benefits to not just the original manufacturer of the component, but potentially to many other entities that have products, systems or equipment that make use of the component or similar component in question.

Figure 9:
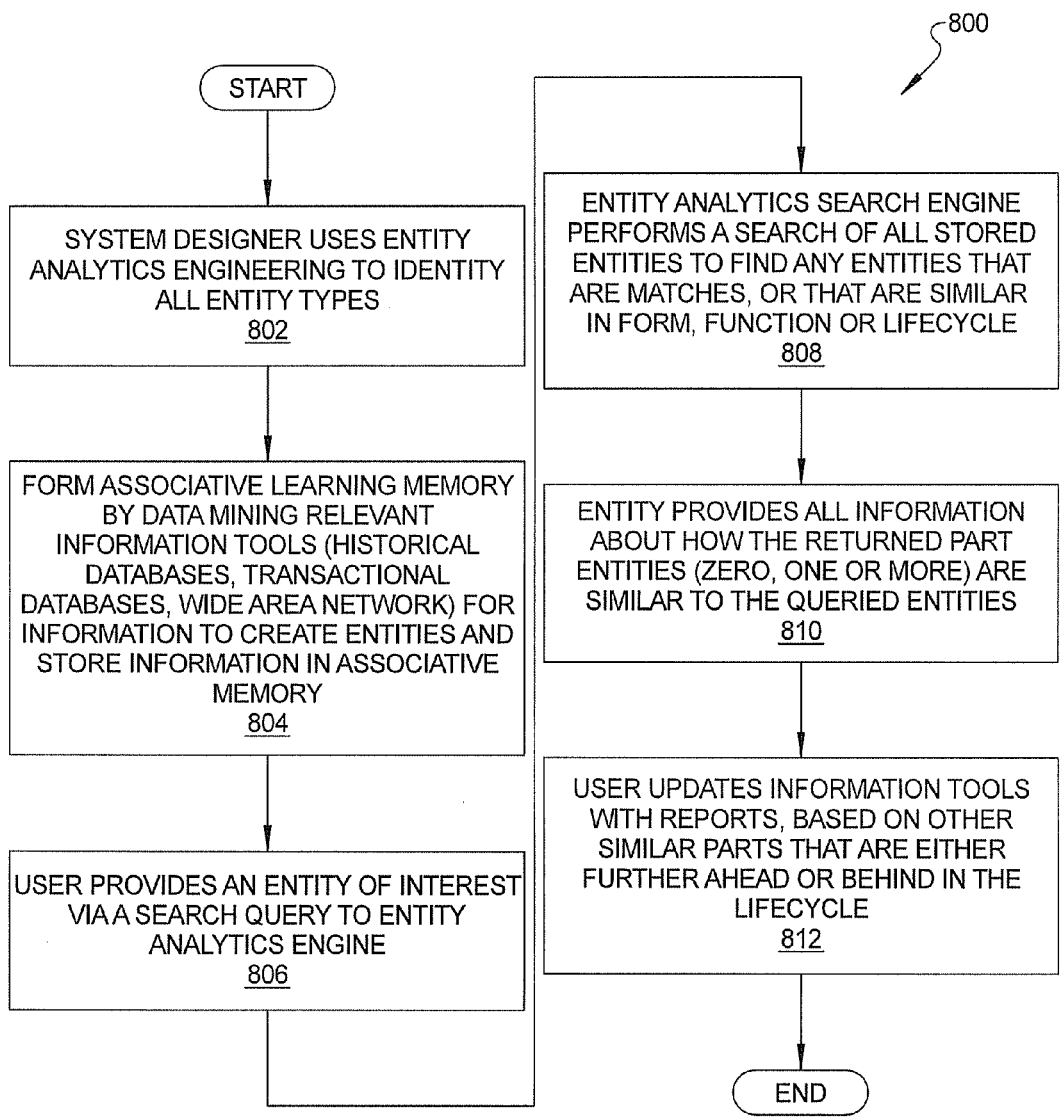
FIG. 9 is a flowchart illustrating operations performed using a method of the present disclosure to perform a non-conformance analysis.

Referring now to FIG. 9, a flowchart 800 is shown of operations performed in forming a non-conformance or lifecycle prediction system. At operation 802 a system designer uses entity analytics engineering principles to identify all the relevant entity types that will be used to categorize the information stored in the associative memory system, such as system 20 in FIG. 1. For the purpose of providing one specific example, assume that the component part that the system designer is considering is an actuator. The entity types defined by the system designer may involve attributes such as, without limitation, part numbers for different types of actuators; manufacturers of all of the actuators defined by the system designer; subsystem names in which all of the various actuators defined are used; equipment or vehicle models (such as aircraft) on which the defined actuators are employed; the names of other components that potentially could be viewed as similar or equivalent in function or operation to the actuator being considered; locations on a vehicle where the actuator is used; environmental factors (e.g., heat, cold, rain, etc.) that the actuator is designed to operate in, and essentially any other factors that may be pertinent to the non-conformance analysis or lifecycle analysis of the actuator. The entities for each entity type may define selected attributes of its associated entity type. For example, an entity type of "Aircraft Model" may have a plurality of entities associated therewith defining a plurality of different models of the aircraft that the actuator has been used on. Another example could be an entity type of "Subsystem" which may have a plurality of different entity types each defining different specific subsystems of an aircraft that the actuator is used in. Still further, an entity type of "Similar Components" may have a plurality of different entities associated therewith that each name different devices or parts that one might reasonably view as being similar to, or equivalent to, the actuator in question. Still further, another entity type might be "Location", which might have a plurality of entities associated therewith that define specific different locations where the actuator is used on an aircraft or other structure or vehicle. The foregoing is not intended to be an exhaustive list, but merely to provide an appreciation of the wide ranging and diverse nature of the entity types and entities that may be defined by the system designer to meet the needs of a specific manufacturing enterprise or other form of application. At operation 804, an associative learning memory is formed, for example associative memory 20, by using the data mining tool 18 to mine information from various information tools, such as historical databases (e.g., historical databases 16), transactional databases (e.g., transactional databases 14) and possibly a wide area network (e.g., wide area network 12). The mined information is used to form the entities and is categorized under the user-defined entity types. The entities are stored in an associative memory system, such as associative memory 20.

At operation 806 an entity analytics engine, such as entity analytics engine 21, is used to receive an entity that is of interest, for example, an entity mentioned as a term in a search query input by the user. In one example the entity may be for a part number, subsystem, or system that has a reported non-conformance.

At operation 808 the entity analytics engine 21 performs searches of information stored in the associative memory system 20 to obtain all entities that are similar to the entity under investigation. Any stored object of information that is the same or similar to the entity of interest, whether in form, function or lifecycle, may be obtained by the entity analytics search engine 21. For example, if the entity is a part number then the "similar to" query will return part numbers that have the similar attributes as the part of interest. The query will also return the attributes that matched so that the user can determine if they are significant. For example, if corrosion is found on a part of interest, and attributes associated with the part of interest included material make up, operating environment, repair history, or in-service year, then it is possible to use this information to look for (or anticipate) that there might be other parts working in the same environment, with the same maintenance schedule, and made of the same material, that may be investigated to determine if they may develop the same corrosion issue.

At operation 810 the entity analytics engine provides all of the retrieved information pertaining to the entities which it has deemed significantly similar to the queried entity. This information may be displayed on a user input device (e.g., input device 22), or alternatively printed out in a report or provided to the user in any other format or medium that is easy to study. Finally, at operation 812 the user may use the input device or any other subsystem to update the information tools (e.g., components 12, 14 and 16) with reports based on other similar parts that are either further ahead or behind in the lifecycle of the part in question. The user may also input any other reports that pertain to the non-conformance analysis or lifecycle investigation just undertaken, and which might be helpful in a future analysis of the same or a similar part.

Figure 10:
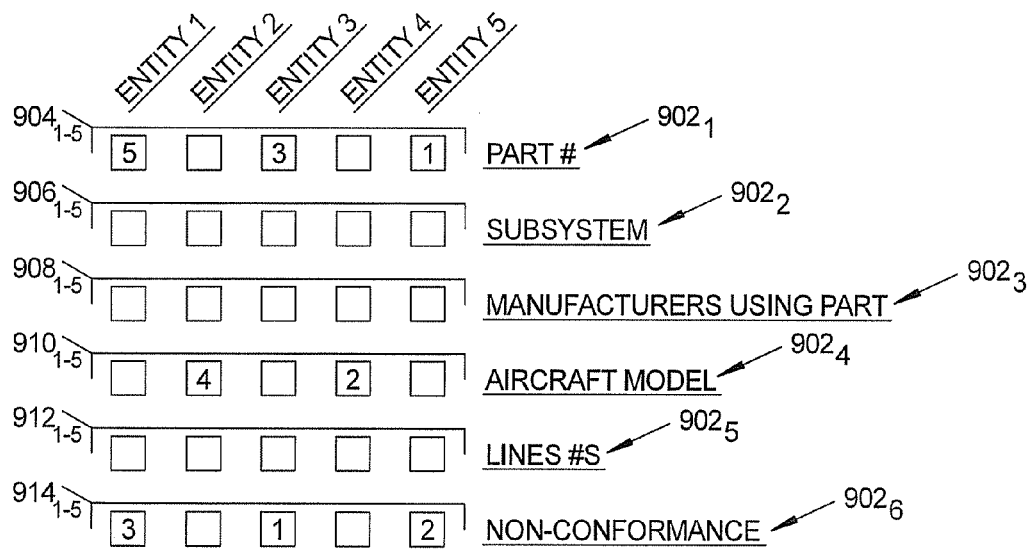
FIG. 10 is a diagram of a plurality of exemplary entity types and entities that may be used in forming the associative memory to tailor it for non-conformance analysis and component lifecycle analysis.

Referring now to FIG. 10 a logic diagram 900 is shown to illustrate an exemplary collection of entity types and entities that may be used in a non-conformance or lifecycle prediction system. In this example it will be assumed that the non-conformance analysis system is being used in an aircraft manufacturing or maintenance environment. In this example the entity types $902_1$-$902_6$ "PART #"; "Subsystem"; "MANUFACTURERS USING PART"; "AIRCRAFT MODEL"; "LINE #s"; and "Non-Conformance Report" have been selected by the system designer for the associative memory 20. Each entity type is shown as including a plurality of boxes that indicate specific entities associated with that particular entity type. Thus, entities $904_1$-$904_5$ are associated with entity type $902_1$; entities $906_1$-$906_5$ are associated with entity type $902_2$; entities $908_1$-$908_5$ are associated with entity type $902_3$; entities $910_1$-$910_5$ are associated with entity type $902_4$; entities $912_1$-$912_5$ are associated with entity type $902_5$; and entities $914_1$-$914_5$ are associated with entity type $902_6$. In practice there may be dozens or more entity types that are selected by the entity analytics search engine 21 depending on the input information that forms the non-conformance analysis query. The numbers in the entity boxes 904-914 indicate the number of times that each entity came up during the searching process. Thus, by looking at information concerning the life spans of components that are identical or similar to the component under investigation, one can more effectively manage the lifecycle of the component under investigation. User reports or documents concerning lifecycles of certain components, that are entered into the information tools 12, 14 and 16, enable the system to effectively "learn" more and more about the lifecycles of various components as the system 10 is used is more and more over a period of time.

The system 10 thus uses entity analytics to provide a new and original way to identify and manage component and system lifecycles, or other significant events in the production and use of complex systems. The system 10 is applicable to any scale commercial or governmental system or process. However, its value increases significantly as the size and complexity of the system or product increases since the product lifecycle management process becomes exponentially more difficult as the size and complexity of the system or mobile platform with which the component increases. Still another advantage is the ability to rapidly correlate multiple sources and multiple formats of informational data, including free text formats. Yet another advantage is the ability of the system 10 to present the retrieved information in such a way that an analyst can rapidly and accurately manage a part through its lifecycle using intelligent queries based on subject matter experts having previously chosen an optimal set of entities. A report may be generated telling the designer or quality engineer analyst or maintainer that further analysis is indicated for a given part, and a part or system may be maintained more efficiently.

Still another advantage of the system 10, when configured for component non-conformance analysis and lifecycle analysis, is that the system makes comparisons across entities, and not using just one database. The system 10 is able to arrive at solutions faster than previously developed database systems because it integrates data from multiple data sources. The system 10 is also able to answer other related questions without re-building the structure of the memory entities. For example, when learning information from one data source about non-conformances or other issues, many different entity types can be updated. For example, if non-conformance reports are added to the system it is possible to remember the non-conformances associated with parts, users, models and line numbers at the same time. Then the system 10 can be used to find parts that have the same lifecyle (part material, maintenance, location, use) and aircraft line numbers that have the same lifecycle For example, consider if the same four parts are fixed on vehicles A and B, and the two vehicles are subsequently used in the same environment. Then it is discovered that one of the four parts replaced on vehicle A has an identified non-conformance. It can be recommended that the same part on vehicle B be inspected. The system 10 can also provide significant advantages in reducing down times for systems or vehicles that employ large numbers of component parts, for example commercial aircraft, marine vessels and rotorcraft. The system 10, when configured for non-conformance analysis, may prove especially useful in proactively determining which component parts should be inspected. Component non-conformances on complex systems such as space vehicles present the additional challenge that once the space vehicle is launched, it is often difficult or impossible to repair malfunctioning components. Thus, being able to select suitable components based on a lifecycle of the component in view of other components on the same or similar system or subsystem, before a spacecraft is launched, provides the opportunity to identify those components that may be less suitable while the spacecraft is in service, before the spacecraft is launched.

In commercial aircraft manufacturing applications, use of the system 10 can help to reduce maintenance times and help the quality engineer to more optimally select certain components based on their component lifecycle, even if such components are not associated with the original work order for the component. For example, if a work order says to replace parts A and B, the system can remember that many times when a work order instructs to "replace A and B", that part C also is replaced. This feature can significantly reduce the down time of the aircraft in an airline's fleet, and reduce the associated lost revenue that results from aircraft downtime. In this manner, the lifecycle of component parts are used to more efficiently manage the maintenance of a complex system such as an aircraft.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A lifecycle management system for a platform, the system comprising:
   associative memory populated with a plurality of matrices, each matrix including entity values and attribute values pertaining to life cycle of the platform,
   the associative memory providing unfiltered correlations between each matrix relative to the other matrices;
   a processor executing an entity analytics engine to perform a search of the unfiltered correlations with respect to a specified component of the platform,
   the search returning any highly correlated entity and attribute values that do not include the specified component but are highly correlated to the specified component;
   wherein the highly correlated entity is the entity with the highest value, that correspond to a number of times the entity is returned within a repetitive search executed by the entity analytic engine; and
   the processor updating a plurality of different information tools with reports based on other similar components that are either further ahead or behind in the lifecycle of the specified component.

2. The system of claim 1, further comprising a user interface for identifying the specified component.

3. The system of claim 1, wherein the plurality of different information tools store historical non-conformance information, reports of specific types of non-conformances previously investigated, and information about the platform.

4. The system of claim 2, wherein the user interface provides free text querying for identifying the specified component, and wherein the entity analytics engine performs a search of the associative memory for words and numbers of the free text query.

5. The system of claim 3, further comprising a database update software system for updating said information tools.

6. The system of claim 3, further comprising a data mining tool for mining the different information tools to obtain entity values and attribute values for populating the associative memory.

7. The system of claim 3, wherein said information tools comprise at least one of:
   an historical database; and
   a transactional database.

8. The system of claim 1, wherein the associative memory is further populated with a second plurality of matrices pertaining to platform non-conformances; and wherein the associative memory provides unfiltered correlations between each matrix of both pluralities relative to the other matrices of both pluralities.

9. The system of claim 1, further comprising an output interface for displaying the attribute values that do not include the specified component but are highly correlated to the specified component.

10. The system of claim 1, wherein the lifecycle includes component material, maintenance, location and use.

11. The system of claim 1, wherein the platform includes a commercial aircraft.

12. A method comprising using a computer to manage a lifecycle of a platform, including:
    populating associative memory with plurality of matrices pertaining to lifecycle information about the platform, each matrix including related entity values and attribute values;
    causing the associative memory to create correlations between each matrix relative to the other matrices;
    searching the correlations for lifecycle entity and attribute values to investigate a component of the platform; and
    displaying any highly correlated entity and attribute values that do not include the component under investigation but are highly correlated to the component under investigation;
    wherein the highly correlated entity is the entity with the highest value that corresponds to a number of times the entity is returned within a repetitive search executed by an entity analytic engine; and
    updating a plurality of information tools with reports based on other similar components that are either further ahead or behind in the lifecycle of the specified component.

13. The method of claim 12, wherein managing the lifecycle further includes populating the associative memory with a plurality of matrices pertaining to platform non-conformances.

14. The method of claim 12, wherein the searching is performed before the component under investigation wears out.

15. The method of claim 12, wherein the lifecycle includes component material, maintenance, location, and use.

16. The method of claim 12, wherein the displaying includes indicating that the component under investigation and another component having the highly correlated attribute and entity values should be inspected.

17. The method of claim 12, wherein the platform includes a commercial aircraft.

18. The method of claim 12, wherein a free text query is used to search the correlations.

19. The method of claim 12, further comprising mining the information tool that includes a historical and transactional databases to obtain entity values and attribute values for the matrices populating the associative memory.

* * * * *